United States Patent

[11] 3,545,560

| [72] | Inventor | Anthony Fox |
| | | Bloomington, Minnesota |
| [21] | Appl. No. | 776,463 |
| [22] | Filed | Nov. 18, 1968 |
| [45] | Patented | Dec. 8, 1970 |
| [73] | Assignee | Sports Power, Inc. |
| | | a corporation of Minnesota |

[54] MOTORIZED SNOW VEHICLE
11 Claims, 4 Drawing Figs.

[52] U.S. Cl. ................................................. 180/5,
280/21, 280/25, 280/28
[51] Int. Cl. ........................................................ B62m 27/02
[50] Field of Search ............................................ 180/5, 3, 4,
6, 9.28, 9.38, 9.3; 280/15, 16, 25, 21, 136, 123,
120, 110, 28, 18, 19, 12

[56] References Cited
UNITED STATES PATENTS

| 630,810 | 8/1899 | Kidder | 280/28 |
| 3,075,622 | 1/1963 | Attwood | 287/189.36 |
| 327,265 | 9/1885 | Hatheway | 280/123 |
| 393,071 | 11/1888 | Kiihr | 280/12.13 |
| 1,800,812 | 4/1931 | Arps | 280/8 |
| 2,970,662 | 2/1961 | Hetteen | 180/5 |
| 3,011,576 | 12/1961 | Howes | 180/5 |
| 3,023,824 | 3/1962 | Bombardier | 180/5X |
| 3,309,150 | 3/1967 | Marier | 305/27 |
| 3,318,403 | 5/1967 | Hansen | 180/5UX |

FOREIGN PATENTS

| 230,824 | 5/1944 | Switzerland | 280/16 |

Primary Examiner—Richard J. Johnson
Attorneys—Frederick E. Lange, John J. Held, Jr. and Eugene L. Johnson ABSTRACT: Motorized snow vehicle having the usual motor operated traction belt and a pair of skis at the front of the vehicle in which both skis are mounted on a transversely extending leaf spring having a central upwardly bowed portion detachably secured to a central kingpin which is a actuated by the steering mechanism. The skis are mounted on the ends of the leaf spring by pivotal connections allowing the front ends of the skis to swing upwardly more than the rear ends.

PATENTED DEC 8 1970
3,545,560
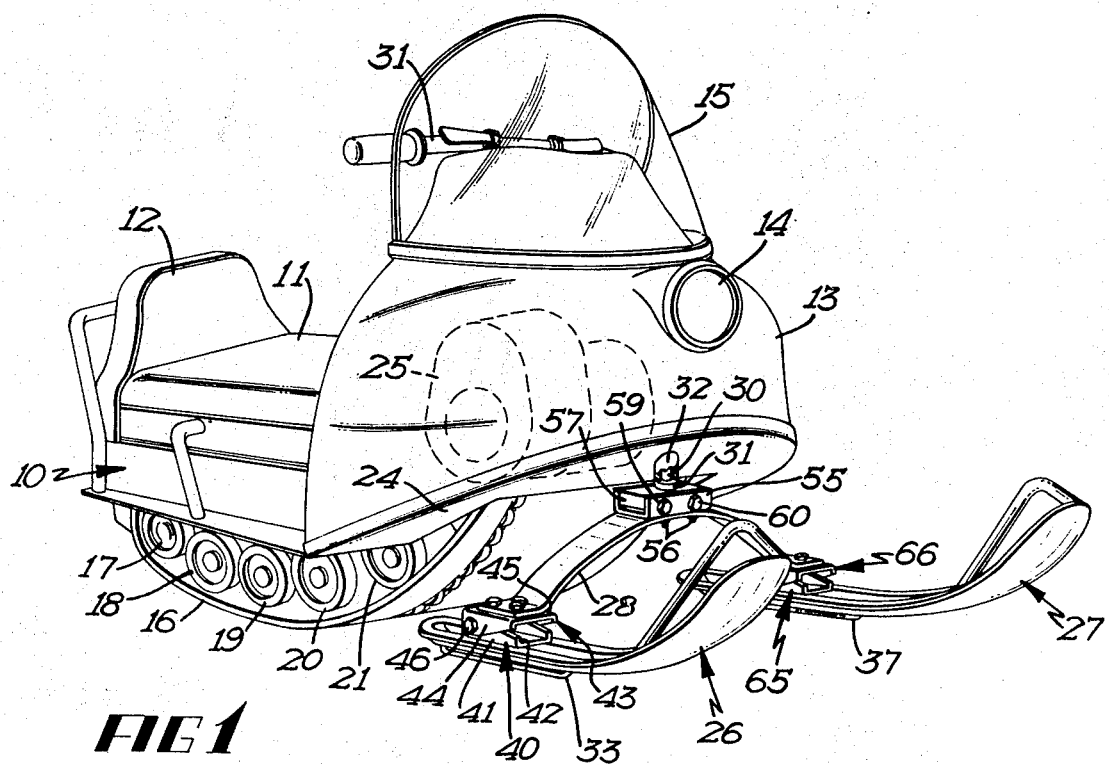
FIG 1
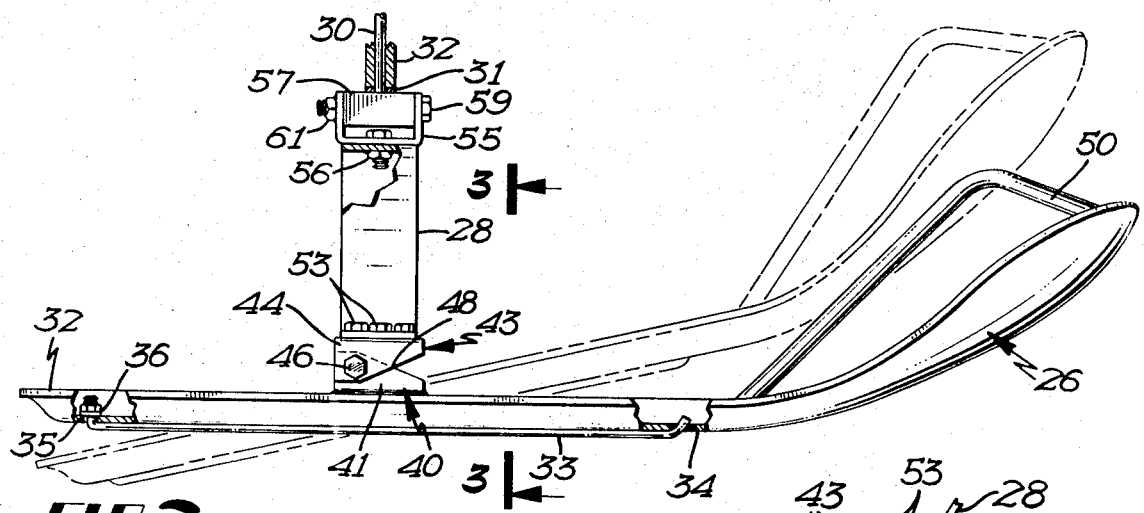
FIG 2
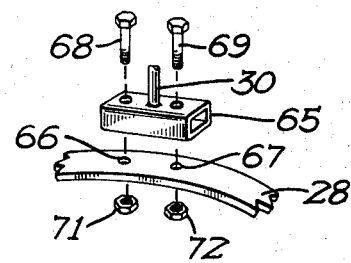
FIG 4
FIG 3
INVENTOR.
ANTHONY FOX
BY Frederick E. Lange
ATTORNEY

3,545,560

MOTORIZED SNOW VEHICLE

BACKGROUND OF THE INVENTION

It is quite common in connection with motorized snow vehicles to provide a traction belt which is driven by some motor means such as a gasoline engine and a pair of skis which are mounted in front of the vehicle and the angular direction of which is changed when it is desired to change the direction of movement of the vehicle. It has been customary in the past to mount the skis on separate kingpins and simultaneously rotate these kingpins by the steering mechanism to change the direction of the skis. There are a number of drawbacks to this type of arrangement. In the first place, it requires a pair of kingpins with connections between the steering mechanism and the kingpins to rotate the two kingpins. Furthermore, because each ski is associated with one of the kingpins, the relative lateral positions of the skis is fixed, this being determined by the lateral spacing of the kingpins. This does not provide for the flexibility in the positioning of the skis that is desirable for steering under high-speed conditions or over rough terrain.

SUMMARY OF THE PRESENT INVENTION

The present invention is concerned with a motorized snow vehicle in which the pair of skis mounted at the forward end of the vehicle are secured to a transversely extending leaf spring means having a central upwardly bowed portion which is secured to a central kingpin. This arrangement has a number of advantages. In the first place, the skis are able to spread apart upon an impact force being exerted upon them. In a turn, the ski on the outside has greater pressure placed on it due to centrifugal force and tends to turn outwardly due to the flexing of the leaf spring means. This helps to stabilize the vehicle and minimize any tendency of it to tip over towards the outside of the curve or for the driver to lose control of the vehicle. If the vehicle is subjected to a bouncing force, the two skis spread apart to stabilize the vehicle and to minimize any tendency of it to tip.

Turning is further aided by the fact that since both skis are attached to the opposite ends of a single member which turns about its midpoint, the ski on the inside of the turn is moved back and the ski on the outside is moved forward when the skis are turned. This results in the distance from the rear to the center of the ski being shorter on the inside of the turn where the length of the turning arc is less than on the outside.

Furthermore, because both skis are attached to a single leaf spring means, it is possible to provide for the ready detachment of the skis from the vehicle. In order to facilitate the detachment of the ski assembly from the kingpin, a connecting means is provided which makes it possible to quickly remove the leaf spring and ski assembly from the kingpin by the removal of a pair of detachable fastener means.

The skis are connected to the opposite ends of the leaf spring by pivotal connections which limit the relative movement when the rear of the ski is tipping upwardly but allows considerable angular movement when the front end of the ski is tipping upwardly. This permits the skis to tip independently about their pivotal connections to accommodate themselves to the underlying terrain without running the risk of the rear end of either ski puncturing the underside of the body of the motorized snow vehicle or engaging the traction belt.

A further feature of the invention is the novel manner in which the runner or wear bars are secured to the skis. By bending one corner of the runner bar at an angle and having this extend through an opening in the underside of the ski and by having the other end extend through an opening in the ski and detachably secured in position by threaded means, it is possible to fasten the ski runners to the ski quickly and securely with a minimum of parts.

Various other objects and features of the invention will be apparent from a consideration of the accompanying specification, claims and drawing.

BRIEF DESCRIPTION OF THE DRAWING

FIG. 1 is a perspective view of my improved motorized snow vehicle;

FIG. 2 is a side view of the ski and leaf spring assembly with portions cut away to show better the manner in which the leaf spring is secured to the kingpin. Portions are also cut away to show the manner in which the runner bar is fastened to the ski;

FIG. 3 is a sectional view taken along a plane indicated by line 3–3 of FIG. 2 and showing the manner in which the leaf spring and ski are pivotally secured together; and FIG. 4 shows an alternative method of fastening the leaf spring to the kingpin.

DESCRIPTION OF THE PREFERRED EMBODIMENT

Referring first to FIG. 1, my improved snowmobile comprises a frame member 10 of any suitable construction. Preferably, I employ a one-piece tunnel frame which includes the body and gas tank. Secured on this frame are seat and back cushions 11 and 12 covered with suitable upholstery material adapted to withstand extremely cold temperatures. Secured to the front of the frame 10 is a molded hood 13 which has a head lamp 14 secured therein. Fastened to the hood 13 is a windshield 15.

The main portion of the frame 10 is supported by the driving track 16 which in turn is supported on a plurality of wheels 17, 18, 19, 20, and 21. These wheels are in turn resiliently secured to the frame 10. The track 16 is driven by a double-sprocket drive, the sprockets in turn being driven by suitable motor means, such as an internal combustion engine located on the frame 10 behind the hood 13. The details of the engine form no part of the present invention and the engine is shown schematically in dotted lines and indicated by the reference numeral 25. A nose pan 24 covers the underside of the front portion of the vehicle and acts as a floor and the bottom of the gas tank.

The front portion of the vehicle is supported by and guided by a pair of skis 26 and 27. Generally, these skis are pivotally secured to the opposite ends of a leaf spring member 28 which has an upwardly bowed central portion which is fastened to a central kingpin 30. This kingpin 30 is connected to the steering mechanism including the handle bar 31 so that upon displacement of the handle bar 31, the kingpin 30 is turned about its axis. The kingpin 30 is suitably journaled in a sleeve 32 secured in the central floor portion of the frame 10. A suitable bearing member 31 is interposed between the bottom of sleeve 32 and the base of kingpin 30.

Referring now to the details of the ski members 26 and 27, the construction of the ski is best shown in FIG. 2 in connection with ski 26. The ski 26 is formed of a strip of sheet steel which is bent upwardly along its outer edges to provide a flange 32 along its outer edge. Secured to the underside of the ski 26 is a runner or wear bar 33, the function of which is to guide the ski and to cause it to move in a direction longitudinally of the ski. This bar 33 also takes the wear when the ski is moving over a hard surface. The runner bar 33 is made of hardened steel. The front end of the runner bar 33 is bent at an inclined angle and inserted through an opening 34 in the forward portion of the ski. The back of the runner bar 33 is bent substantially vertically and passes through an opening 35 near the rear of the ski. The runner bar is held in place by a nut 36 threadedly engaged with the rear of the runner bar. The novel means I employ for fastening the runner bar 33 to the ski 26 permits the bar to be fastened to the ski with a minimum of effort. This is important not only in facilitating the original assembly but also in connection with replacement of bar 33 when it is excessively worn. All that it is necessary to do to attach the bar 33 is to insert the forward end of the bar through the opening 34 while the bar is tilted so that its forwardly inclined end is substantially vertical. The bar 33 is then tilted in a clockwise direction until the rear end enters the opening 35. The nut 36 is then applied to the threaded end of the runner bar and tightened in position. It is understood that both skis 26 and 27 are provided with such runner bars, the runner bar in connection with ski 27 being partly shown in FIG. 1 and being identified by the reference numeral 37.

A bracket 40 is secured to the oppositely disposed portions of flange 32 of ski 26 as by welding, as best shown in FIG. 3. This bracket is provided with two flanges 41 and 42. Pivotally connected to the bracket 40 is a cooperating bracket 43 which likewise has two side flanges 44 and 45. The brackets 40 and 43 are provided with apertures through which a bolt 46 is passed to cause the brackets 40 and 43 to be pivotally connected together. The back walls of the side flanges 41 and 42 and 44 and 45 extend vertically with respect to the longitudinal axis of the flanges. The front walls of these flanges, however, are cut away to provide inclined surfaces, typical of which is the inclined surface 48 of bracket member 43. By reason of the forward edges of the flanges 41 and 42, 44 and 45 being inclined with respect to their longitudinal axes, it is possible for bracket 40 to rotate in a counterclockwise direction a substantial distance before the outer end of the bracket engages the upper center wall of bracket 43. The clockwise rotation of bracket 40, however, is relatively limited because before it has rotated any substantial amount in this direction, its rear upper end engages the upper central portion of bracket 43. The significance of this feature is that the forward end of the ski can move up a substantial distance as the vehicle moves over uneven terrain. The rear upward movement of the ski is limited, however. It would be undesirable to allow the rear end of the ski to move substantially because it might otherwise engage the underside of the nose pan 24 or the traction belt 16 and cause damage to the same. The swinging of the ski about the bracket 43 in a direction in which the forward end of the ski moves upwardly is illustrated by the dotted line position of the ski 26 in FIG. 2.

The ski 26 has secured at its forward end a curved bar 50 which is fastened at two points to the ski. The bar may be fastened in any suitable manner as by welding. The purpose of bar 50 is to provide a means for readily gripping the skis. It also serves to reinforce the forward upwardly curved portion of the ski.

The bracket 43 is secured by any suitable fastening means such as bolts 53 to the underside of the outer portion of the leaf spring 28. This outer portion, as best shown in FIG. 1, extends horizontally beyond the central bowed portion. By reason of the bracket members 40 and 43, the ski 26 is secured to the outer end of the leaf spring member 28 in such a manner that the ski is capable of limited pivotal movement. As pointed out above, this pivotal movement is greater when the forward end of the ski is moving upwardly than when the rear end of the ski is moving upwardly.

Secured to the central portion of the upwardly bowed portion of leaf spring 28 is a yoke member 55 which is substantially U-shaped in cross section. The lower base member of this yoke member is fastened to the leaf spring 28 by suitable fastening means 56. The yoke member 55 has front and back walls which are adapted to straddle a block 57 of rectangular cross section. The block 57 is in turn secured to the kingpin 30 which is journaled in the sleeve 32, as previously described. The front and back walls of yoke 55 are provided with aligned apertures which are aligned with corresponding apertures in block 57. Bolts 59 and 60 extend through these apertures from the forward wall of bracket 55 and are threadedly engaged with corresponding nuts 61 (only one of which is shown in the drawing). These nuts 61 are permanently secured to the rear wall of bracket 55 as by welding. It will be readily apparent that by unscrewing the bolts 59 and 60 so that they are detached from the nuts 61, the bolts can be withdrawn and the yoke 55 detached from the block 57. This enables the entire ski assembly including the leaf spring 28 to be detached from the rest of the vehicle. Since the nuts 61 remain in position, it is only necessary to employ a single wrench to disconnect yoke 55, and hence the entire ski assembly, from the snowmobile. Furthermore, since the heads of the bolts 59 and 60 are exposed at the front of the vehicle, they are readily accessible. The ease with which the ski assembly may be detached and attached to the vehicle is particularly important when it is considered that it may be necessary to detach the ski assembly for such purposes as transporting the vehicle, in severely cold and stormy weather. Under these conditions, it is extremely undesirable to have an arrangement in which it is necessary to thread a nut onto a bolt in an awkward inaccessible location. With my arrangement, the yoke 55 need merely be placed over the block 57 with the ends of the yoke and the block aligned and the bolts 59 and 60 can then be inserted through the various aligned holes and engaged with the nuts 61 which remain in position on the yoke 55.

In describing the method of mounting the skis, reference has been made only to ski 26. It is to be understood, however, that the ski 27 is similarly mounted on the opposite end of leaf spring 28 by brackets 65 and 66 which are identical to brackets 40 and 43 and which need not be described again in detail. The manner of mounting bracket 65 to ski 27 and the manner in which bracket 66 is mounted to the outer end of ski 28 is the same as in the case of brackets 40 and 43.

It will be readily apparent from the foregoing description that the two skis 26 and 27 are mounted on the ends of a single leaf spring 28 which acts as a torsion member. The center portion of this leaf spring is secured to the single kingpin 30 which is journaled in the bearing 32. The kingpin 30 is actuated by the steering mechanism and when so actuated, rotates the leaf spring 28 to simultaneously change the angular direction of both the skis 26 and 27. The mounting of skis 26 and 27 on the opposite ends of the leaf spring 28 has a number of advantages. It is quire common to drive motor operated snow vehicles such as that of the present invention over relatively uneven terrain. The result is that the vehicle may be bounced considerably and may be tipped appreciably. With the conventional arrangement in which each of the two front skis is secured to a separate kingpin, the lateral spacing of the front skis remains relatively constant. With my arrangement, however, any impact applied to the center of the leaf spring 28 by reason of the bouncing action tends to cause the leaf spring to flatten out. This in turn causes the skis 26 and 27 to spread outwardly. The advantage of this is that the position of the vehicle is stabilized as the distance between the skis increases due to the force being exerted. This, in turn, tends to prevent any undesired tipping of the vehicle 10.

A further advantage of my suspension arrangement for the skis 26 and 27 is in connection with making turns. Whenever a turn is made, the centrifugal force tends to throw the weight outwardly and place greater weight upon the ski on the outside of the turn. When this greater force is applied to the ski on the outside of the turn, the leaf spring on the side of that ski tends to flex outwardly to move the ski outwardly. This in turn helps to stabilize the vehicle and prevent it from tilting toward the outside of the turn being made. Thus, it is possible with my novel means for mounting the skis to make turns at much higher speeds or much shorter turning radii than is possible with a conventional type of arrangement in which each ski is mounted on a separate kingpin.

The leaf spring 28 not only flexes upward and downward but also tends to yield laterally in response to a longitudinal force being exerted on the skis due to resistance to movement of the skis. This results in a twisting action on leaf spring 28 so that the latter acts as a torsion member to absorb the longitudinal force being exerted on the skis.

In addition to the advantages discussed above, the arrangement of the skis on the opposite ends of a single leaf spring 28 carried by the central kingpin 30 has the further advantage that when the kingpin is turned to effect a turn of the vehicle, the ski on the inside of the turn moves back and the ski on the outside of the turn moves forward. Thus, the effective distance between the rear of the vehicle and the midpoint of the ski is greater on the outside of the curve than on the inside. This facilitates turning of the vehicle since the side of the vehicle on the inside of the turn is turning through a shorter arc.

MODIFICATION OF FIGURE 4

While the means for mounting the leaf spring 28 shown in FIGS. 1 and 2 is the preferred embodiment, I may employ the arrangement shown in FIG. 4 which has the advantage of employing slightly fewer parts. In this arrangement, a hollow metal block 65 is secured to the lower end of the kingpin 30. Vertical holes are drilled through this block which holes align with corresponding holes 66 and 67 in the leaf spring 28. Two bolts 68 and 69 are passed through the aligned openings in block 65 and through the openings 66 and 67 in the leaf spring 28. These bolts 68 and 69 cooperate with nuts 71 and 72 which engage the underside of the leaf spring member 28. In this manner, the leaf spring 28 can be readily attached or detached from block 65 and hence from kingpin 30 simply by loosening the nuts 71 and 72 so that the leaf spring 28 can be withdrawn. While the arrangement of FIG. 3, as pointed out above, eliminates the need for a separate yoke member 55, it has the drawback that the bolts 68 and 69 are not as readily accessible as the bolts 59 and 60 of the preferred embodiment.

CONCLUSION

It will be seen that I have provided a motorized snow vehicle in which the forward skis are mounted in a very simple manner to the steering mechanism and the vehicle. The skis can readily be attached or detached from the vehicle. Furthermore, the mounting means permits either or both skis to move laterally when an undue vertical force is applied to the ski or skis. This in turn helps to stabilize the vehicle whether the force has arisen by reason of the vehicle going over some unusually rough terrain or whether it is due to the vehicle being turned at relatively high speed. Further, due to both skis swinging about a single central kingpin, turning is aided by the decrease in the effective length of the surfaces engaging the snow on the inside of the turn and a corresponding increase in the effective length of said surfaces on the outside of the turn.

It will furthermore be seen that I have provided a novel and extremely simple method of allowing substantial upward pivoting movement of the skis in one direction while limiting the upward movement of the skis in the opposite direction so as to prevent damage to the underside of the vehicle. It will also be seen that I have provided an extremely simple manner of attaching a runner bar to the underside of a ski.

While I have shown certain specific embodiments of the invention for purposes of illustration, it is to be understood that the invention is limited in scope solely by the appended claims.

I claim:

1. A motorized snow vehicle comprising a frame, a traction means secured to said frame centrally thereof and supporting the rear portion of the frame, motor means for driving said traction means, a pair of skis, and means for mounting said skis beneath the front of said frame with said skis normally extending parallel to the longitudinal axis of said frame, said mounting means comprising a kingpin journaled in the forward portion of said frame centrally thereof, and a flat leaf spring means having the flat sides thereof extending generally horizontally and having a central upwardly bowed portion secured to said kingpin to rotate therewith for steering said vehicle, said leaf spring means also having lower laterally outwardly extending end portions each secured to an intermediate portion of one of said skis.

2. The vehicle of claim 1 in which steering means is secured to said kingpin for turning said kingpin about its longitudinal axis to turn said leaf spring means and hence to change the angular direction of said skis with respect to said frame.

3. The vehicle of claim 1 in which pivotal mounting means are employed for fastening said skis to the outer end portions of said leaf spring means.

4. The vehicle of claim 3 in which each of said pivotal mounting means includes two pivotally connected portions, the front and rear cooperating walls of which are shaped so that the movement of the rear portions of the skis which is permitted by said pivotal mounting means is relatively small as compared with the permitted upward movement of the front portions of the skis.

5. The vehicle of claim 1 in which said leaf spring means is secured to said kingpin by detachable securing means so as to enable said leaf spring means and said pair of skis secured thereto to be removed readily.

6. The vehicle of claim 5 in which said detachable securing means includes a pair of bolts readily accessible from the front of the vehicle.

7. The vehicle of claim 5 in which said detachable securing means comprises a block secured to said kingpin, a yoke secured to said leaf spring means and of a size to snugly fit over said block, and screw threaded fastening means for holding said yoke and block together.

8. The vehicle of claim 7 in which the yoke has front and back walls having two pairs of aligned apertures, in which nuts are permanently secured to the back wall aligned with the apertures therein, and in which bolts pass through the apertures in the front walls and through said block and are threadedly engaged with said nuts.

9. The vehicle of claim 5 in which said detachable securing means comprises a block secured to said kingpin and a plurality of screw threaded fastening members extending vertically through said block and the engaging portion of the leaf spring means.

10. The vehicle of claim 1 in which each of said skis is secured to an outer portion of said leaf spring means by a bracket secured to the upper surface of the ski and in which each ski has a rod secured on the underside thereof and running longitudinally of said ski, said rod having one end inclined upwardly at an angle of less than 90° and extending through an aperture in said ski with the outer portion of said inclined and overlying and engaging directly the upper surface of said ski to retain said end in position without the use of any fastening member and the other end extending vertically through another aperture in said ski and retained in position by a detachable fastening member.

11. A motorized snow vehicle comprising a frame, a traction means secured to said frame centrally thereof and supporting the rear portion of the frame, motor means for driving said traction means, a pair of skis, and means for mounting said skis beneath the front of said frame with said skis normally extending parallel to the longitudinal axis of said frame, said mounting means comprising a kingpin journaled in the forward portion of said frame centrally thereof, and a flat leaf spring means having the flat sides thereof extending generally horizontally and having a central upwardly bowed portion secured to said kingpin to rotate therewith for steering said vehicle, said leaf spring means also having lower laterally outwardly extending end portions each secured to an intermediate portion of one of said skis, the securing means for securing the kingpin to the leaf spring means comprising a block secured to the kingpin and a plurality of fastening members extending vertically through said block and the leaf spring means.